(12) United States Patent
Falik et al.

(10) Patent No.: US 8,467,457 B2
(45) Date of Patent: Jun. 18, 2013

(54) SYSTEM AND A METHOD FOR CONTROLLING ONE OR MORE SIGNAL SEQUENCES CHARACTERISTICS

(75) Inventors: Yohai Falik, Raanana (IL); Eran Vered, Ramat Gan (IL)

(73) Assignee: Mobixell Networks (Israel) Ltd, Ra'Anana (IL)

( * ) Notice: Subject to any disclaimer, the term of this patent is extended or adjusted under 35 U.S.C. 154(b) by 1241 days.

(21) Appl. No.: 12/014,368

(22) Filed: Jan. 15, 2008

(65) Prior Publication Data

US 2008/0170630 A1 Jul. 17, 2008

Related U.S. Application Data

(60) Provisional application No. 60/885,013, filed on Jan. 16, 2007.

(51) Int. Cl.
*H04N 11/02* (2006.01)

(52) U.S. Cl.
USPC ..................................... 375/240.26

(58) Field of Classification Search
USPC ............. 375/240.01, 240.29, 240.02, 240.26, 375/240; 370/391, 392, 230, 230.1, 235, 370/252
See application file for complete search history.

(56) References Cited

U.S. PATENT DOCUMENTS

| | | | |
|---|---|---|---|
| 6,978,049 B2 * | 12/2005 | Chui et al. | 382/240 |
| 7,155,010 B2 * | 12/2006 | Wee et al. | 380/37 |
| 7,526,565 B2 * | 4/2009 | Amini et al. | 709/231 |
| 7,533,075 B1 * | 5/2009 | Soferman et al. | 706/52 |

* cited by examiner

*Primary Examiner* — Kwang B Yao
*Assistant Examiner* — Anh Ngoc Nguyen

(57) ABSTRACT

The present invention provides controllers, systems and methods that apply techniques for determining signal sequence characteristics that propagate through a sequence of buffers. One of the buffers represents buffering characteristics of a network through which the signal sequence propagates. The signal sequence may include packets of a media stream and the network may include a wireless network.

23 Claims, 9 Drawing Sheets

SYSTEM AND A METHOD FOR CONTROLLING ONE OR MORE SIGNAL SEQUENCES CHARACTERISTICS

FIELD OF THE INVENTION

The present invention relates generally to controllers, systems and methods for video compression, and more particularly to controllers, systems and methods for controlling signal sequence characteristics of a signal sequence that propagates via multiple buffers.

BACKGROUND OF THE INVENTION

Digital video must be extensively compressed prior to transmission and storage, where each picture includes multiple pixels and each pixel is associated with multiple multi-bit values.

In a typical scenario, a non-compressed media stream, or "raw" media stream, includes a sequence of substantially equal frames. These frames are eventually presented at a constant rate. As described below, once the media stream is compressed, the size of frames may vary. The transmission of a varying frame size media stream over a network may encounter timing problems, because these frames must be provided in a timely manner to a media player to enable smooth viewing of a video, for example.

Various compression standards, such as, but not limited to the MPEG standards, enable efficient storage and transmission of media information.

Spatial compression usually includes transform coding, quantization and variable length encoding. Transform coding is operable to convert a group of picture pixels to a set of discrete cosine transform (DCT) coefficients. The DCT coefficients of a block represent a predefined number of picture pixels, such as 8×8. The pixels are then quantized and are represented by pairs of amplitude/run-lengths, where the run-length value indicates the number of zeroes between two non-zero coefficients. The amplitude/run-length pairs of a macro-block are coded by a variable length-coding scheme to provide compressed video streams.

Temporal compression is based upon the fact that there is usually little difference between consecutive video frames. A compressed media stream includes many sequences of temporally compressed frames. Each sequence is initiated as a self-contained key-frame, which is independent of preceding frames and is followed by several Inter-frames. Each Inter-Frame includes the difference between itself and at least one other frame.

As a result of the compression schemes, access units of complex scenes are represented by more bits than other access units. Complex scenes, for example, have low temporal redundancy and/or low spatial redundancy. MPEG-4 presentations include a number of media elementary streams, such as video elementary streams and audio elementary streams. Each media elementary stream includes multiple access units, e.g. samples. An access unit is a coded representation of a presentation unit. An audio access unit is the coded representation of an audio frame, while a video access unit includes the data required for presentation of a picture.

An MPEG-4 presentation may be provided to a client device in a streaming mode or in a download mode. A typical client device has a player buffer and a client player. In download mode the presentation is stored at the client device memory (such as the client buffer) and can be later fetched from the memory and processed (by the client player) to enable the display of that presentation. In streaming mode the client device displays the streamed presentation. In streaming mode, trade-offs are needed between the bit rates of the streaming elementary streams, the available bandwidth for streaming these elementary streams over a communication network and the client processing and/or buffering capabilities.

Mismatches may result in client buffer (also termed target buffer or player buffer) over-flow, in which the client device receives too much information and must throw away a part of the information, or in client buffer under-flow (in which the client device does not receive enough information to enable a smooth and/or continuous display of the presentation). Furthermore, as various elementary streams are streamed to the client device, a bit-rate mismatch may result in loss of the desired synchronization between elementary streams. Typically, over-flow is easier to prevent.

Media streams can be transmitted over a network at a constant bit rate (CBR) or at a varying bit rate (VBR). CBR requires a compression of an access unit by a compression ratio (QSCALE) that is responsive to the size of that access unit, as larger access units must be compressed at a higher compression ratio than smaller access units in order to achieve a relatively constant bit rate. VBR usually does not require such a relation between its compression ratio and the size of its access units, but may encounter temporal timing and buffering problems.

Four scientists from the University of Southern California developed a technique named "Multi Threshold Flow Control (MTFC)," that is described as a "multi-threshold online smoothing technique for variable rate streams," R. Zimmerman, K. Fu, M. Jaharangiri and C. Shahabi."

MTFC smoothes variable bit rate (VBR) transmissions from a server to a client, without a priori knowledge of the actual bit rate. MTFC utilizes multi-level buffer thresholds at the client side that trigger feedback information sent to the media server. Once a client buffer threshold is crossed, it initiates a feedback process that in turn adjusts the sending rate of the server. The feedback process is based upon a prediction of future bit rate consumption. Three bit rate consumption algorithms were suggested, one being a fuzzy logic based algorithm.

SUMMARY OF THE INVENTION

Accordingly, it is a principal object of the present invention to fully exploit available bandwidth It is another principal object of the present invention to deliver a stream with the highest available quality, without losing packets.

It is one other principal object of the present invention to deliver a stream with the highest available quality, without causing the player to stop for re-buffering.

The invention provides a method for determining at least one signal sequence characteristic of a signal sequence that propagates through at least three cascaded buffers. The method includes a first step of providing status information reflecting a status of at least two buffers of said at least three buffers. The first step is followed by a second step of applying at least one process to determine the at least one signal sequence characteristic, in response to the status information.

The invention provides a method for determining multiple signal sequence characteristics of a signal sequence that propagates through at least two cascaded buffers. The method includes the steps of providing status information reflecting a status of at least one cascaded buffer; and applying at least one process to determine multiple characteristics of the signal sequence, in response to the status information. This method may provide that the at least two cascaded buffers are a network buffer and a streamer buffer, a network buffer and a player buffer or a player buffer and a streamer buffer.

The invention provides a method for determining at least one signal sequence characteristic of a signal sequence that propagates through a network towards a target buffer. The method starts receiving status information reflecting a status of at least the target buffer and a network buffer representative of the buffering characteristics of the network. This initial step is followed by a step of applying at least one process to determine, in response to the status information, the at least one signal sequence characteristic.

The invention provides a method for determining at least one signal sequence characteristic of a signal sequence that propagates through a network towards a target buffer. The method starts providing status information reflecting a status of at least the streamer buffer and a network buffer representative of the buffering characteristics of the network. This initial step is followed by a step of applying at least one process to determine, in response to the status information, the at least one signal sequence characteristic.

The invention provides a controller for determining at least one signal sequence characteristic of a signal sequence that propagates through at least three cascaded buffers. The controller receives status information reflecting a status of at least a third buffer and a second buffer of the at least three cascaded buffers and to provide output representative of at least one signal sequence characteristic of the signal sequence.

The invention provides a system for transmitting a signal sequence via an intermediate buffer towards a target buffer. The system includes: (i) a status information providing means, for providing status information reflecting a status of at least the target buffer and the intermediate buffer; (ii) a controller, coupled to the status information providing means to determine at least one signal sequence characteristic, in response to the status information; and (iii) a signal sequence provider, for transmitting at least a signal sequence portion in response to the at least one signal sequence characteristic.

The invention provides a system for transmitting a signal sequence via an intermediate buffer towards a target buffer. The system includes: (i) a status information providing means, for providing status information reflecting a status of at least the streamer buffer and the intermediate buffer; (ii) a controller, coupled to the status information providing means to determine at least one signal sequence characteristic, in response to the status information; and (iii) a signal sequence provider, for transmitting at least a signal sequence portion in response to the at least one signal sequence characteristic.

The invention provides a method and system that may include a process that is also responsive to network policy rules. The process may be updated in response to previously determined characteristics. This update may be implemented by neural networks. Alternatively, this may be implemented by a state machine.

The invention provides a system for transmitting a signal sequence towards an intermediate buffer towards a target buffer. The system includes a status information providing means, for providing status information reflecting a status of at least the target buffer and the intermediate buffer; a controller, connected to the status information providing means, for applying at least one process to determine at least one signal sequence characteristic, in response to the status information; and signal sequence provider, for transmitting at least a signal sequence portion in response to the at least one signal sequence characteristic.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE DRAWINGS

Figure 1A:
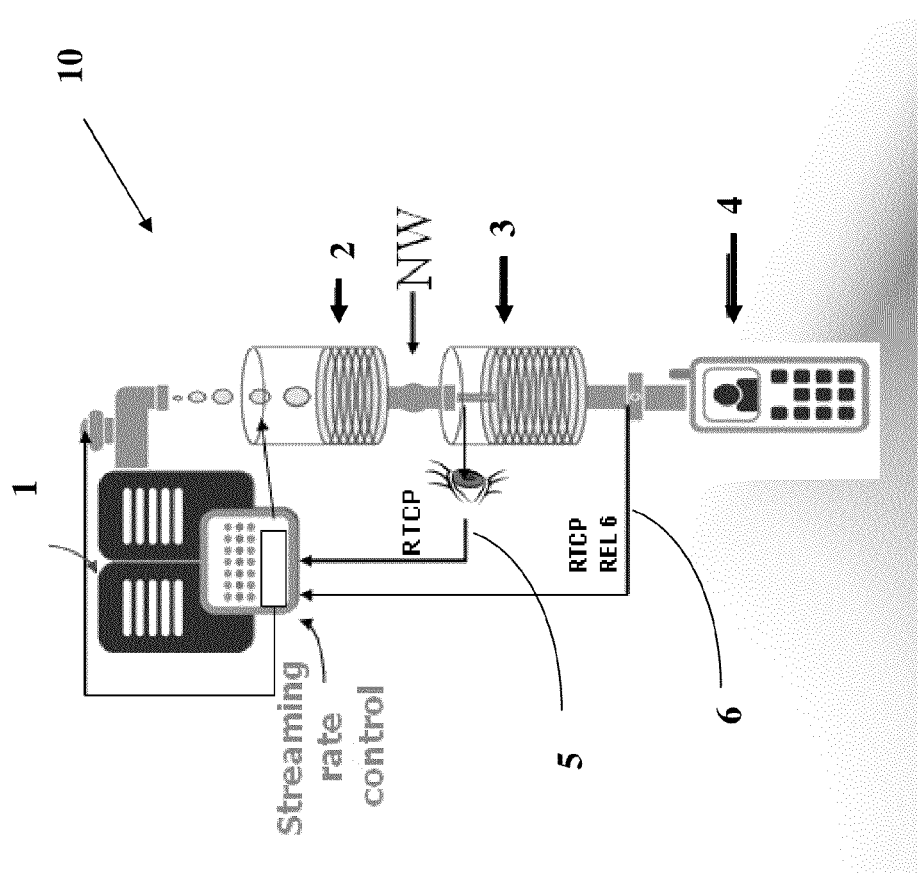
FIG. 1a is an analogous illustration of "flow" through a system to provide media streams to a client, according to an embodiment of the present invention.

It has been observed that information relating to a propagation of signal sequence through a cascade of buffers, such as a media streams propagating through a buffering network towards a client buffer, is characterized by a degree of uncertainty. This uncertainty usually results from unknown timing differences between the generation of a status report, such as a player buffer status report, and the reception and processing of the status report by a controller. This uncertainty may, additionally or alternatively, result from a limited inherent inaccuracy of the reports themselves. For example, the status of the buffer may be updated only after a whole packet is received. Typically, the report is received every 1 to 2 seconds, and includes information about packets that were fully received.

According to embodiments of the present invention, the signal sequence is a media stream that is streamed from a streamer buffer, through at least one network that has buffering characteristics, towards a client buffer. The client buffer is accessed by a media stream decoder that decodes the media streams in accordance with timing information such as presentation time stamps (PTS's) embedded within the media stream packets. For convenience of explanation the drawing and the related description refer to these embodiments.

Cellular networks, such as General Packet Radio Service (GPRS) networks can be modeled by a backbone buffer and an access buffer. Furthermore, both of these buffers can be modeled as a single network buffer. The GPRS network is used to convey media streams over a cellular network to a client device, such as a handset equipped with a client buffer and a player decoder that are connected to each other.

Various embodiments of the invention are based upon status reports sent from the player device. The reports may include details about media stream packets that were received by the player buffer and in some cases even the media stream packets that were retrieved from the player buffer. The streamer may store a table that includes information about transmitted media stream packets, such as ID, length and/or timestamps, such as Playing Time Stamp and Transmission Time stamp—transmittal time from the streamer buffer. This information may be transmitted periodically and/or in response to certain events. These reports enable estimation of network buffer status as well as player buffer status.

An exemplary embodiment of the present invention uses a model of at least three cascaded buffers. The first buffer, and especially its occupancy levels are irrelevant, thus the remaining dual cascaded buffer model can be used. The third buffer of the three buffer model thus may become a second buffer of the dual buffer model, the second buffer of the three buffer model becomes the first buffer of the dual buffer model and the retrieval rate from the first buffer of the three buffer model becomes the provision rate to the first buffer of the dual buffer model. Thus a dual buffer model may include the network buffer as the first buffer and a client buffer as a second buffer. The buffer of the streamer is omitted. Note that the dual buffer model, as well as the three buffer model can be expanded to a model that includes more than two or three buffers.

FIG. 1a is an analogous illustration of "flow" through a system 10 to provide media streams to a client, according to an embodiment of the present invention.

The data flow is as follows:

1. Encoded packets are sent from the server 1 and enter the network buffer 2.

2. Packets from network buffer 2 are sent, according to the available bandwidth, to the player 4 and enter the player buffer 3. Real Time Control Protocol (RTCP) reports 5 are sent from player 4, and report to server 1 about the last packet that arrived at player 4.

3. Player 4 decodes the packets and plays them at playing speed.

Transfer of packets and reports 5 are done through Real Time Protocol/Real Time Control Protocol (RTP/RTCP).

Some embodiments may support the 3rd Generation Partnership Project (3GPP) release 6 (R6) extensions of RTCP 6.

The goal of the present invention is to fully exploit the available bandwidth, and deliver a stream with the highest available quality, without losing packets, and without causing player 4 to stop for re-buffering.

This is done by making sure that network buffer 2 is not too full, and also that it is not empty.

If network buffer 2 is too full, then player buffer 3 may be too empty. This causes buffering. Also packets may be dropped by the network in this case. In addition, the reaction of the system to bit-rate changes is slower when the network buffer is full.

If network buffer 2 is empty, it is possible that all the available bandwidth is not being exploited.

Terminology

1) TTS—time to send.
2) RR—Receive Report
3) SR—Sender Report
4) FPS—frames per second Algorithm Overview System 10 receives notifications whenever one of the following occurs:
 a packet is sent;
 an RR arrives; and
 an SR is sent According to these notifications system 10 estimates the current status of network buffer 2 and player buffer 3. This is an example of a specific state machine implementation.

Whenever an RR arrives system 10 decides, according to the current status on the new bit-rate for encoding and the new streaming rate.

Figure 1B:
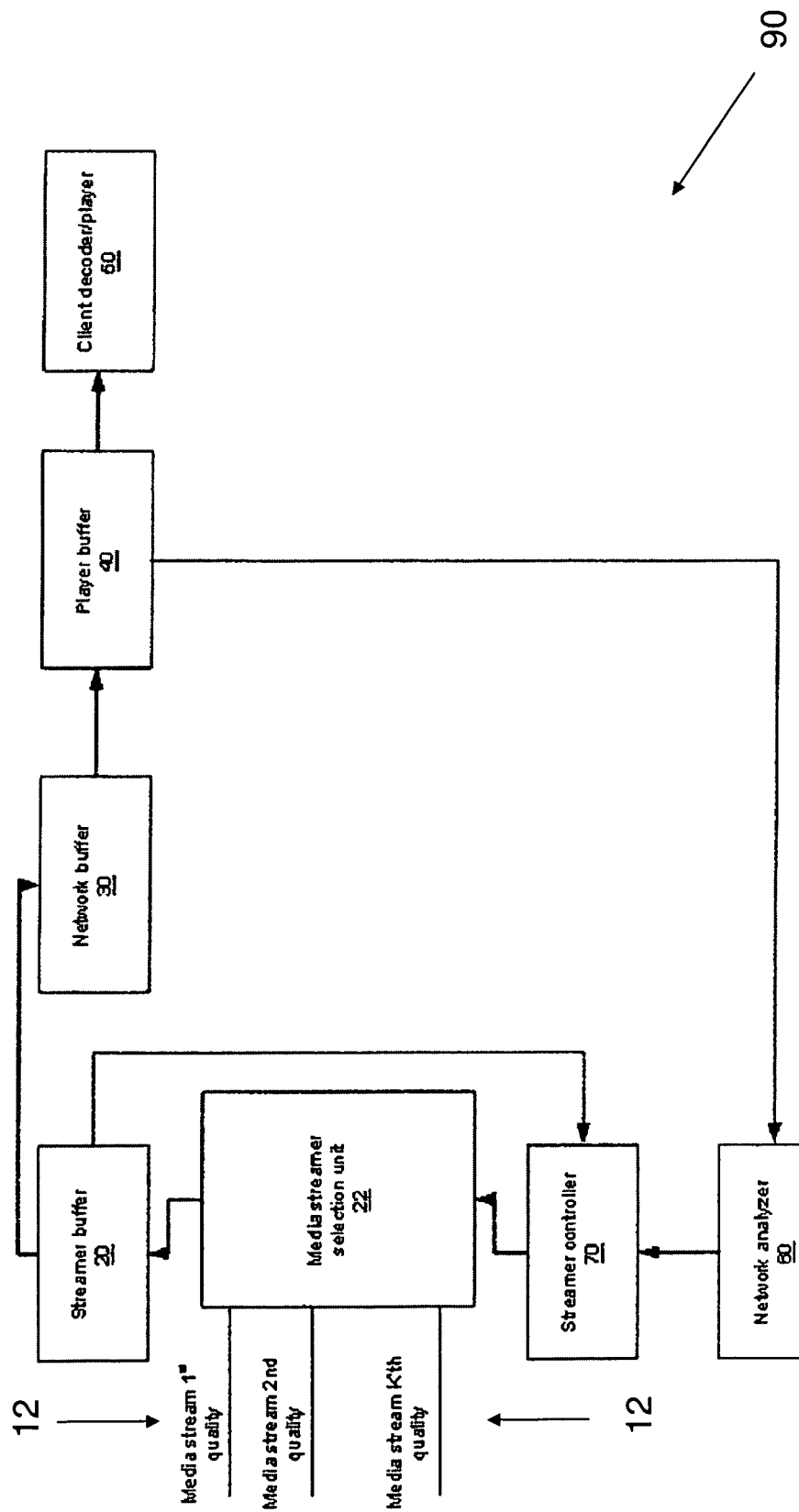
FIG. 1b is a schematic illustration of a model of a system for providing media streams to a client, in accordance with an embodiment of the invention.

Reference is now made to FIG. 1b, which illustrates a system 90 for providing media streams to a client, in accordance with an embodiment of the present invention. FIG. 1b is a schematic illustration of a model of a system for providing media streams to a client, in accordance with an embodiment of the invention.

System 90 includes a network analyzer 60 that is connected to a player buffer 40, also called a target buffer and to a controller, i.e. "streamer controller" 70. System 90 also includes a media streamer selection unit 22 that is connected to controller 70, to a streamer buffer 20 and to a source (not shown) of a media stream. The media stream source can provide media streams of different quality.

FIG. 1b illustrates a scenario in which the media stream source generates multiple versions of the same media stream having differences in quality 12. Media stream versions of quality 12 may differ by their encoding level. It is noted that encoding levels are usually defined to comply with certain bandwidth constraints and/or processing capabilities.

Each version may be independently processed, while according to other embodiments of the present invention, the media stream is represented by a basic level representation and one or more enhancement layers. An enhancement layer reflects the difference between a media stream of a certain compression level and the basic layer. If enhancement layers are used, the selection process involves selecting the basic layer and then one or more enhancement layers.

It is noted that the present invention can also be implemented in conjunction with various encoding methods, such as, but not limited to multiple descriptive coding (MDC), in which a certain content is encoded to provide multiple representations of said content. Each representation may be used to reconstruct the content, but if multiple representations are provided to an encoder, the quality of the reconstructed content is improved. MDC is known in the art, thus does not need additional description.

The method is also capable of being implemented with yet further coding schemes. For example, separate components of a media stream may be encoded in different ways. These components may include background, video, audio, 3D animation, etc. Each component is encoded separately. In such a scenario the "encoding level" is implemented in a broader sense. Thus, the more bandwidth that is available, the more components that are transmitted, or else they are just omitted.

According to other embodiments of the present invention the media stream is represented by various versions of quality 12. These versions may vary in size, but the size difference may result from various processing steps that differ in compression. For example, they may differ by their error correction characteristics. At least one version of the media stream may be larger than the media stream itself.

The media streamer selection unit 22 selects which version of media stream quality 12 to send to streamer buffer 20. The decision is made either periodically and/or in response to predefined events.

Such a selection may involve switching between versions of media stream quality 12. There are various prior art methods for seamless switching that may be utilized. One such method comprises switching at independently decodable frames, such as MPEG key frames. According to another embodiment of the invention the switch can be made at arbitrary points of the media stream, by using the system and methods that is described in U.S. pat. applic. Ser. No. 10/209, 889 titled "Scalable Multi-level video coding," filed 2 Aug. 2002, which is incorporated herein by reference.

According to an embodiment of the present invention the media stream source does not provide multiple versions of the same media streams, but is capable of changing the encoding level of a media stream in response to control signals from streamer controller 70. In this embodiment media stream selection unit 22 may be omitted, as the switching operation is replaced by encoding operations executed by the source. It is noted that according to an embodiment of the invention the encoding levels may be continuous rather then discrete. Such a change in encoding level can be found in live encoding or FGS-fine granularity scalability in the MPEG-4 standard.

Streamer buffer 20, network buffer 30, also known as an intermediate buffer, and player buffer 40 are connected to each other to provide a cascade of buffers. Media stream packets sent to streamer buffer 20 from unit 22 are later retrieved from streamer buffer 20 at a streaming rate denoted by $R_S(n)$, where index n is a positive integer. These packets are received by at least one network that is represented by network buffer 30, to be retrieved at a network rate denoted by $R_N(n)$. The media stream packets are received at player buffer 40 to be retrieved to a client decoder/player 50, according to timing information associated with these packets.

Media stream selection unit 22 and streamer buffer 20 form a signal sequence provider, for transmitting media stream packets in response to the outputs from streamer controller 70. Streaming buffer 20 also provides information on sent packets to streamer controller 70. As mentioned above, media streamer selection unit 22 may be replaced by media encoders/compressors.

It is noted that although FIG. 1b describes a media stream selector 22 that receives fully processed, or otherwise fully encoded quality versions of the media streams 12 and may select one of the versions, this is not necessarily so. According to an embodiment of the invention, part of the media stream can be stored in a compressed form, while the remainder is provided to a compressor/encoder (not shown) during the retrieval of the compressed part. According to yet another embodiment of the invention, media stream quality versions 12 can be stored in a partially compressed form, to be fully compressed during the selection and transmission steps. A partially compressed media stream can include a media stream that is associated with motion vectors, but this is not necessarily so.

First Embodiment

According to a first embodiment of the present invention a first control scheme is provided. This control scheme aims to maintain network buffer 30 slightly filled (almost empty) and maintain player buffer 40 partially full. In such a state packets that enter network buffer 30 are not unduly delayed, and the chances of player buffer 40 overflow or underflow are reduced. Player buffer 40 is preferably about half full, but this is not necessarily so. It is noted that avoiding network buffer overflow is of a higher priority than preventing network buffer underflow.

The first control scheme includes two processes. The first process receives as input, information representative of the occupancy of network buffer 30 and outputs a variable, representative of a change in the streaming rate.

The second process receives as input, information relating to the status of packetized media streams that were transmitted from the media streamer and outputs a variable representing an encoding level of the media stream.

Figure 2:
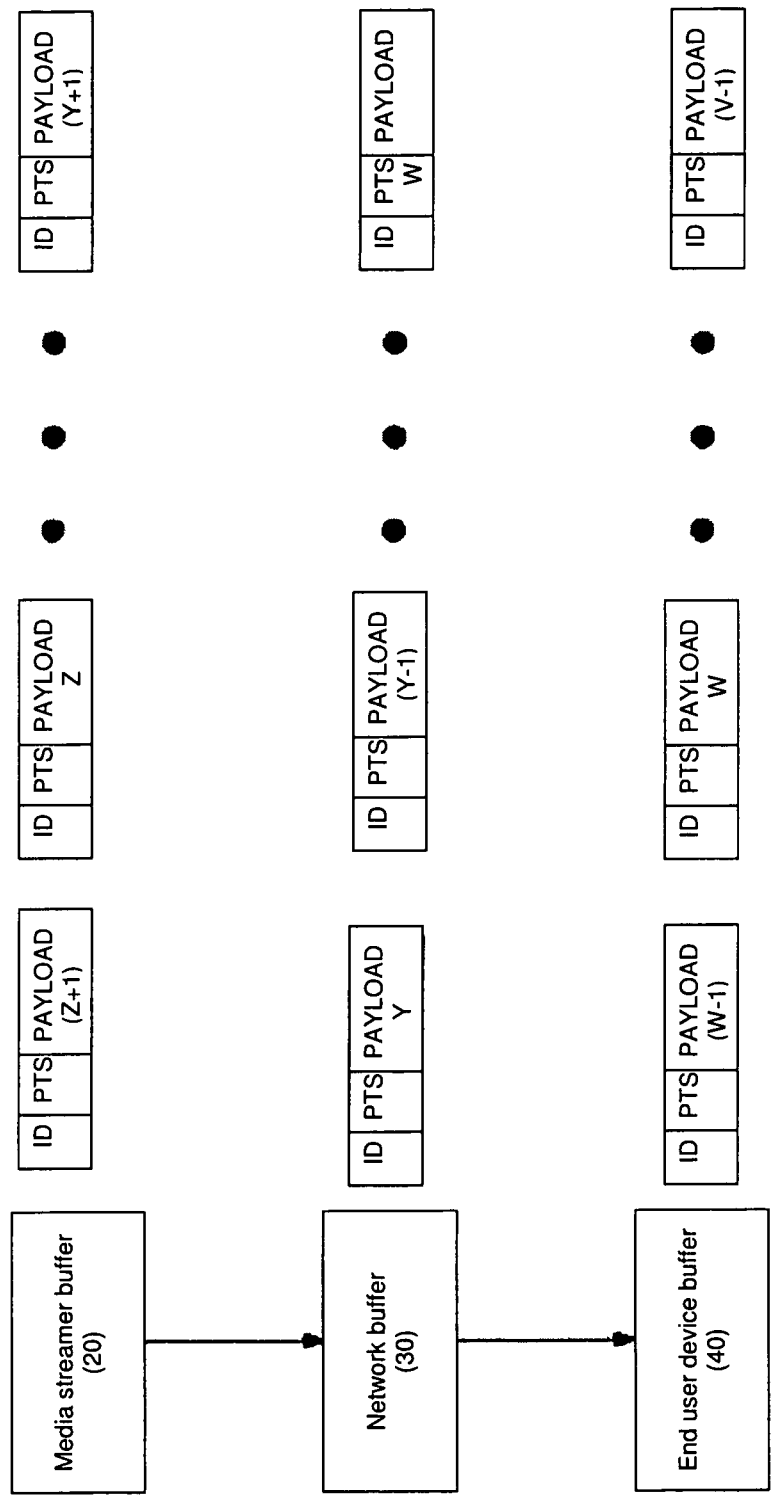
FIG. 2 is a schematic illustration of an exemplary status of packets within a streamer buffer, a network buffer and a player buffer, in accordance with an embodiment of the invention.

FIG. 2 is a schematic illustration of an exemplary status of packets within a streamer buffer, a network buffer and a player buffer, in accordance with an embodiment of the invention. FIG. 2 illustrates an exemplary status of media stream packets within streamer buffer 20, network buffer 30 and player buffer 40 (also known as the end user device buffer). Streamer buffer 20 stores the $(Z+1)^{th}-(Y+1)^{th}$ packets of the media stream. Network buffer 30 stores the $Y^{th}-W^{th}$ packets of the media stream. Player buffer 40 stores the $(W-1)^{th}-(V-1)^{th}$ packets of the media stream. Client decoder/player 50 currently processes the $(V-2)^{th}$ packet of the media stream. Each media stream packet includes an identification field (denoted by ID) and a timing information field (denoted by Presentation Time Stamp (PTS)).

As illustrated in FIG. 1, player buffer 40 (or any other client device/entity) transmits a status report to network analyzer 60 relating to the media stream packets that are stored within player buffer 40. This report may include the ID of the last packet that was buffered, such as W-1 in the case illustrated in FIG. 2, or the PTS of that packet ($PTS_{W-1}$), and the ID of the last packet sent to the client decoder/player 50 (V-2). The report may include only a portion of said information, but may also include additional information. Usually, either the packet ID or PTS are transmitted, as the streamer is aware of the mapping between them.

Those skilled in the art will appreciate that other report formats may provide adequate information, such as transmitting the occupancy of the player buffer or a representation of said occupancy, for example a buffer occupancy threshold that is passed. For simplicity of explanation it is assumed that the ID of the last buffered packet is transmitted and its corresponding timing is known. It is either transmitted by client player buffer 40 or stored within the streamer before it is transmitted over the network.

Figure 3:
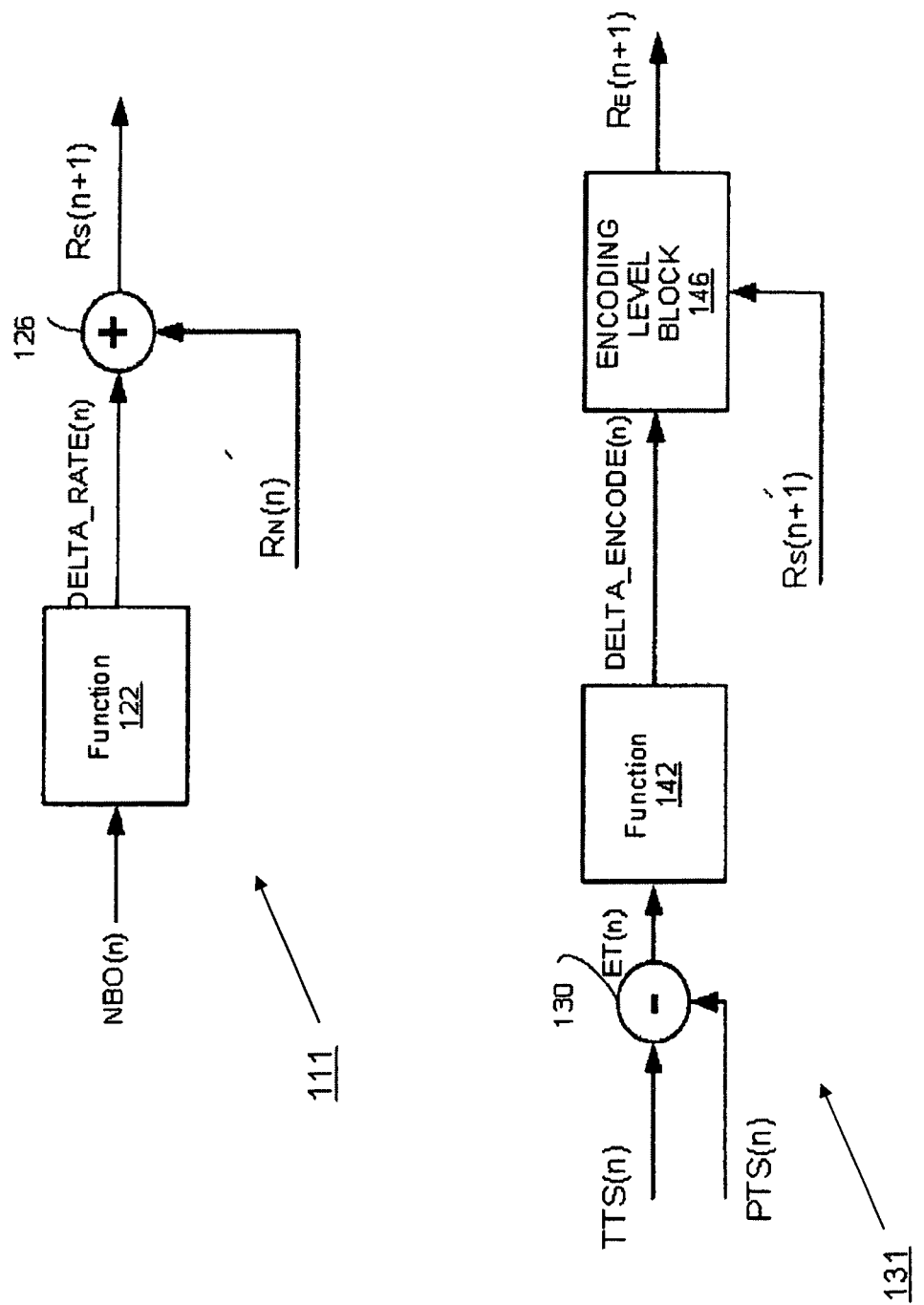
FIG. 3 is a detailed schematic illustration of two processes, in accordance with an embodiment of the invention.
Figure 6B:
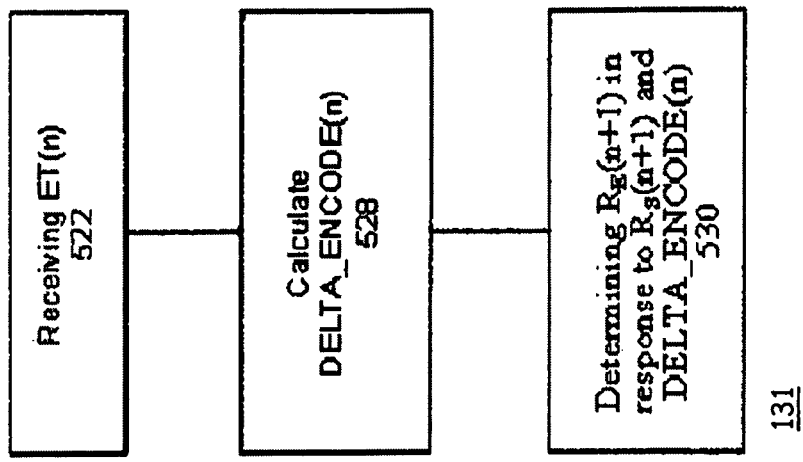
FIGS. 6a-6b, 7a-7b and 8 are flow chart diagrams of processes, in accordance with embodiments of the invention.
Figure 6A:
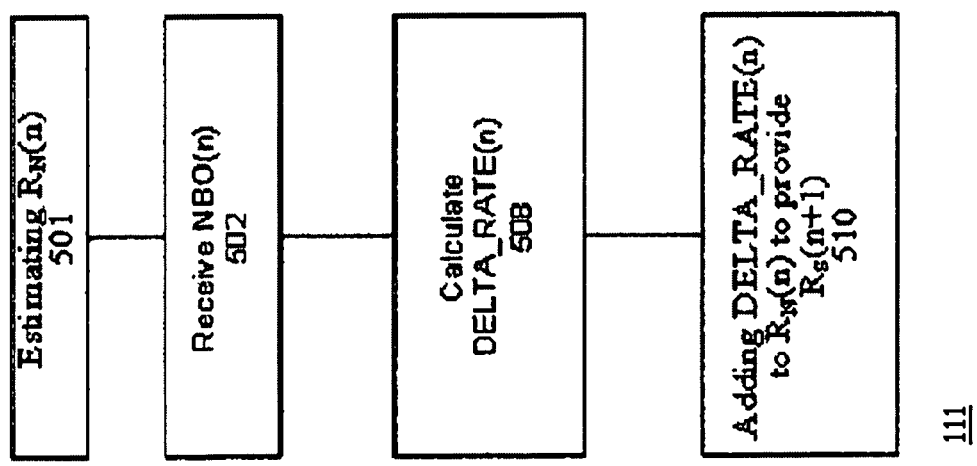

Reference is now made to FIGS. 3, 6a and 6b, which illustrate in greater details the two above-mentioned processes. FIGS. 6a and 6a are flow chart diagrams of processes, in accordance with embodiments of the invention.

FIG. 3 is a detailed schematic illustration of two processes, in accordance with an embodiment of the invention.

In step 502 of FIG. 6a, the first process 111 of FIG. 3 receives an input variable NBO(n) representing the current occupancy of network buffer 30, as estimated from the difference between the next packet that is supposed to be received at player buffer 40 (driven from client buffer status reports) and the last packet that was sent from the streamer buffer 20. The process is executed in intervals and "n" is a positive integer that denotes a sequence number of an interval. Referring to FIG. 2, this difference is responsive to the aggregate size of the $Y^{th}-W^{th}$ media stream packets. The network buffer occupancy may also be defined in response to timing information associated with the media packets that it stores. For example, it may reflect the difference ($PTS_{W-1}-PTS_Y$) between the PTS of the $(W-1)^{th}$ packet and the PTS of the $Y^{th}$ packet.

In FIG. 3 function 122 calculates DELTA_RATE(n) 508, as shown in FIG. 6a, using a number of thresholds and parameters. For example, the function can use two parameters: NBDL—Network buffer desired level and NRF—Network response factor. In this example DELTA_RATE(n)=[NBO(n)−NBDL]/NRF In step 510 of FIG. 6a, DELTA_RATE(n) is added by adder 126 of FIG. 3 to the current network rate $R_N(n)$ to provide the next streaming rate $R_S(n+1)$.

In step 501 of FIG. 6a the current network rate $R_N(n)$ can be estimated in various ways. For example, it may substantially equal a ratio between (a) the aggregate size of packets transmitted over the network during a predefined time window and (b) the length of that time window. Referring to FIG. 2, and assuming that a large enough time window was selected to include the transmission of the (W−1)$^{th}$ till the (V−1)$^{th}$ packets, then $R_N(n)=[SIZE((W-1)^{th}$ packet)+...+SIZE((V−1)$^{th}$ packet)]/[TA$_{(V-1)}$−TA$_{(W-1)}$], whereas TA are the arrival time of the packets to the player buffer. It is noted that shorter time windows may be selected and that other methods for estimating $R_N(n)$ are known.

In step 522 of FIG. 6b the second process 131 of FIG. 3 receives as an input variable a difference ET(n) between a presentation time stamp (PTS) of a media packet that was transmitted from the streamer buffer, usually the last media packet that was transmitted from streamer buffer 20 (FIG. 1b), and the transmission stamp of the media packet (TTS). In step 522 of FIG. 6b subtracting unit 130 of FIG. 3 performs the subtraction and provides ET(n).

Note that ET(n) may also be responsive to buffering periods—periods in which the player device requested reception of packets, but did not receive any because the player buffer was empty.

The buffering periods can be estimated by comparing successive player reports to identify reports in which the last received packet remains the same.

In FIG. 3 function 142 calculates DELTA_ENCODE(n) in reference block 528 of FIG. 6b using a number of thresholds and parameters. For example, function 142 can use two thresholds MAPLT—Maximal PTS less Time To Send (TTS) and MIPLT—Minimal PTS less TTS. Function 142 can use these thresholds to calculate DELTA_ENCODE(n) 528 as summarized in Table I below:

TABLE I

| ET(n) | DELTA_ENCODE(n) |
|---|---|
| ET(n) > MAPLT | 1 |
| (ET(n) <= MAPLT) AND (ET(n) >= MIPLT) | 0 |
| ET(n) < MIPLT | −1 |

In step 530 of FIG. 6b DELTA_ENCODE(n) and the next streaming rate $R_S(n+1)$ are provided to an encoding level block 146 of FIG. 3 that determines the next encoding level $R_E(n+1)$.

According to an embodiment of the present invention $R_E(n+1)=R_S(n+1)+$DELTA_ENCODE(n). According to another embodiment the encoding level block 146 of FIG. 3 selects the encoding level, out of a set of possible levels, in response to this sum. This may include finding the best matching encoding level.

According to an embodiment of the present invention the difference between $R_E(n+1)$ and $R_E(n)$ is limited. According to another embodiment of the invention the process may select between an encoding level out of a sequence of encoding levels. Once a certain encoding level is selected during a certain step the process cannot select during a consecutive step an encoding level that differs greatly from that encoding level.

Second Embodiment

According to this embodiment a second control scheme is provided. This scheme is responsive to the occupancy of player buffer 40. The occupancy can be in terms of aggregate packet size or in aggregate playing time associated with the packets.

Figure 4:
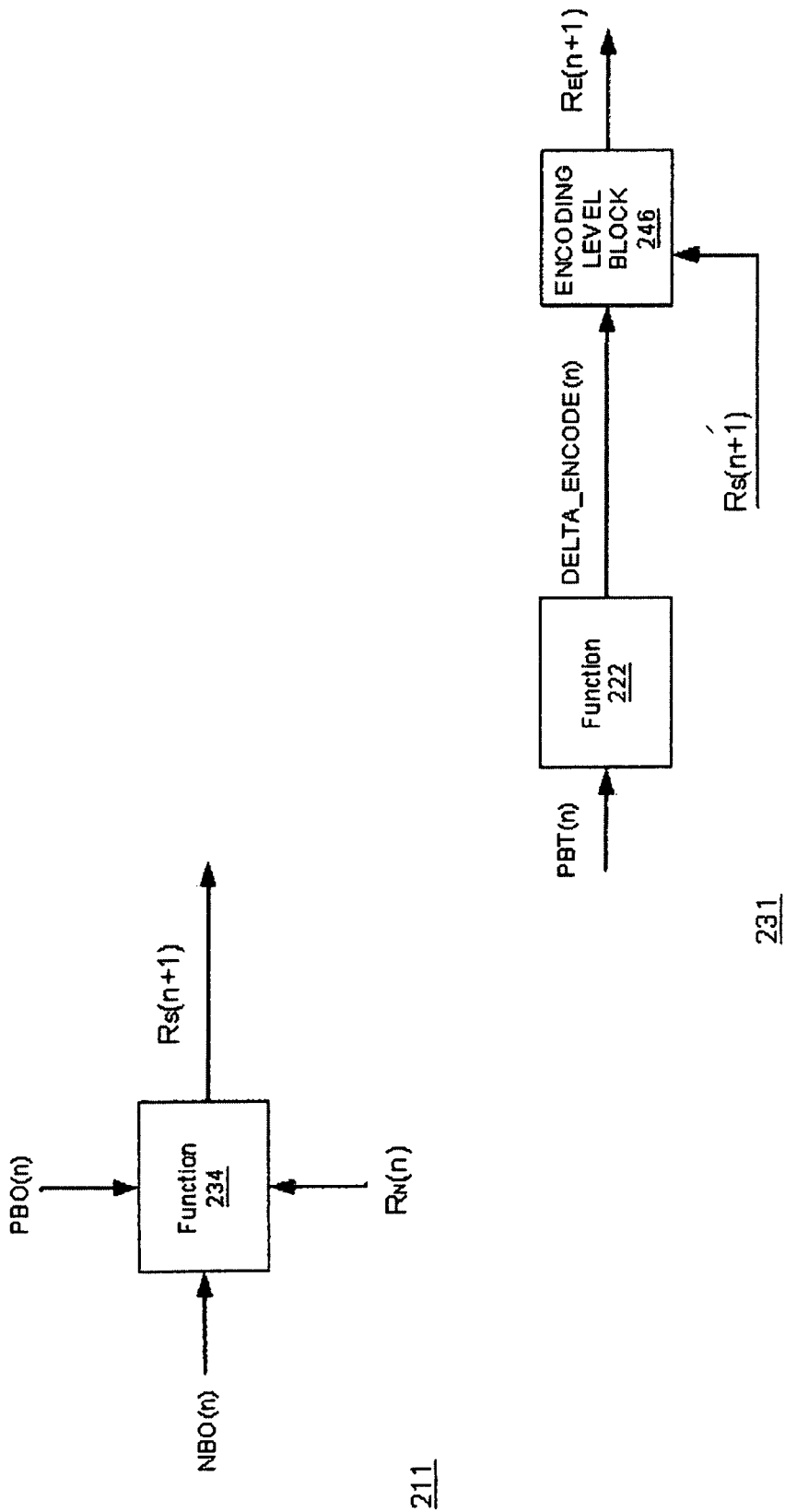
FIG. 4 is a detailed schematic illustration of processes, in accordance with another embodiment of the invention.

FIG. 4 is a detailed schematic illustration of processes, in accordance with another embodiment of the invention. FIG. 4 illustrates the two processes included in the second control scheme.

Figure 7B:
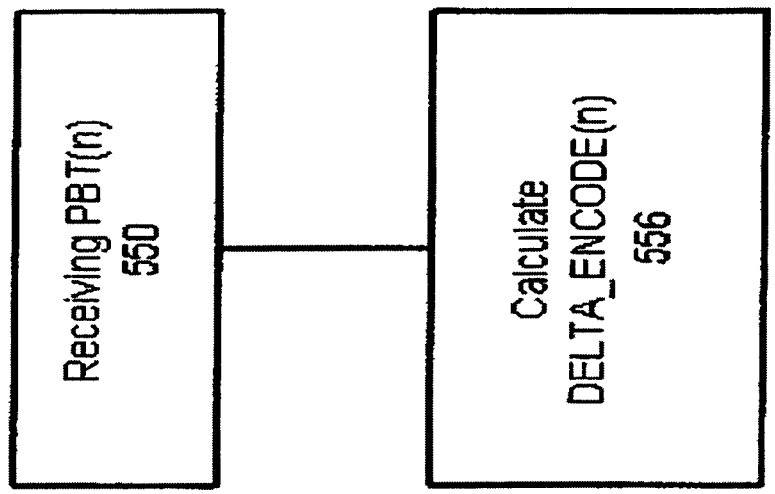
Figure 7A:
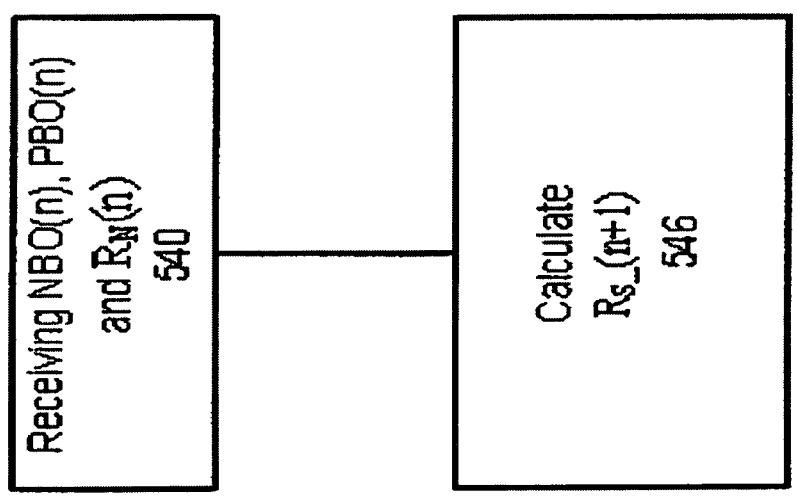

In step 540 of FIG. 7a the first process 211 of FIG. 4 receives as input the network buffer occupancy NBO(n), the network bit rate $R_N(n)$ and the player buffer occupancy PBO(n). Its output is representative of the next streaming rate $R_S(n+1)$.

The second process 231 of FIG. 4 receives as input the aggregate playing time of packets within the player buffer PBT(n) and outputs the encoding level of the media stream $R_E(n+1)$.

Referring back to first process 211, function 234 calculates the next streaming rate $R_S(n+1)$ 546 using a number of thresholds and parameters as shown in step 540 of FIG. 7a described below. For example, function 234 can use four parameters: NBDL—Network buffer desired level, NRF—Network response factor, PBML—player buffer maximal level and MEL—maximal encoding level.

In this example:

```
If (PBO(n) < PBML)
{
R_S(n+1) = R_N(n) + [NBO(n)− NBDL] / NRF
}
else
{
R_S(n+1) = MAX [(0.9 * (R_N(n)), (R_N(n) + [NBO(n)−NBDL] / NRF)]
}
```

In step 550 of FIG. 7b, as described below, the second process 231 of FIG. 4 receives an input variable PBT(n) reflecting the aggregate playing time associated with packets that are stored in the player buffer. Referring to FIG. 2, this aggregate playing time may substantially equal PTS$_{W-1}$−PTS$_{V-1}$.

Figure 8:
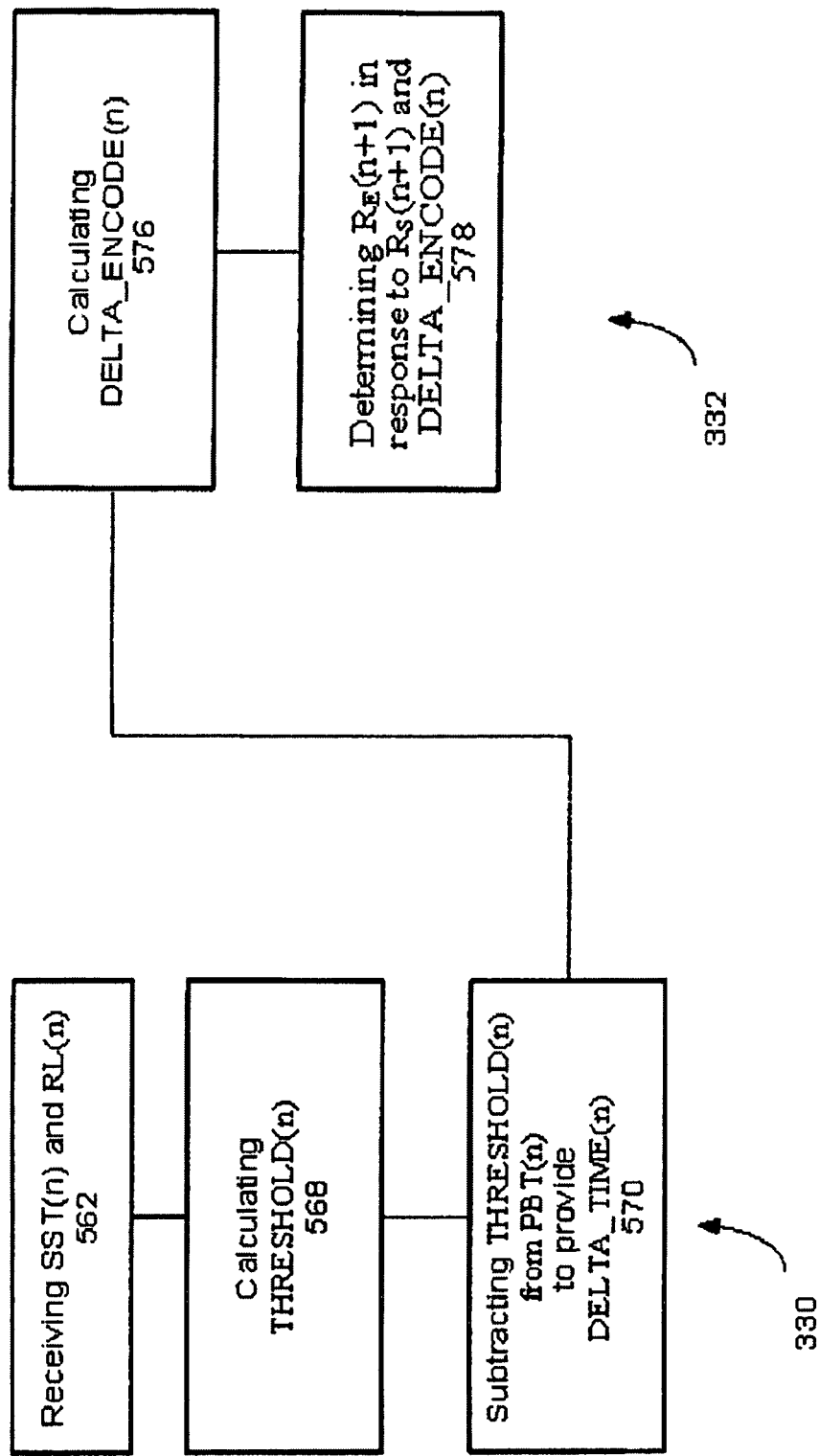

Function 222 in FIG. 4 calculates DELTA_ENCODE(n) 556 in FIG. 7b and calculates DELTA_ENCODE(n) 576 in FIG. 8 using a number of thresholds and parameters. For example function 222 can use two thresholds MATIP—Maximal time in player buffer and MITIP—Minimal time in player buffer. Function 222 can use these thresholds to calculate DELTA_ENCODE(n) 556 as summarized in Table II below:

TABLE II

| PBT(n) | DELTA_ENCODE(n) |
|---|---|
| PBT(n) > MATIP | 1 |
| (PBT(n) <= MATIP) AND (PBT(n) >= MITIP) | 0 |
| PBT(n) < MITIP | −1 |

DELTA_ENCODE(n) and the next streaming rate $R_S(n+1)$ are provided to an encoding level block 246 that determines what shall be the next encoding level $R_E(n+1)$.

According to an embodiment of the invention $R_E(n+1)=R_S(n+1)+$DELTA_ENCODE(n). According to another embodiment encoding level block 246 selects the encoding level from a set of possible levels, in response to the resulting sum $R_E(n+1)$ of this equation.

Third Embodiment

In this embodiment the control scheme is responsive to the status of the streaming process and especially to whether the streaming process approached starts, ends or is in an intermediate state.

As described in prior art "Reducing Broadcast Delay" By Bill Birney, Microsoft Corporation, April 2003, found at http://www.microsoft.com/windows/windowsmedia/howto/articles/BroadcastDelay.aspx when the streaming process begins, it is desirable to allow a fast and smooth start of the presentation at the client device, rather than wait until a certain amount (usually in terms of playing time) of media stream packets are stored in the player buffer, before initiating the presentation. This goal may be achieved by reducing the encoding level of the media stream at the beginning of the streaming process. This method is usually called "fast start" or "zero buffering".

The innovation of this embodiment regards the end of the streaming process and implementation of both the start and the end of the streaming process using the control scheme described below. Typically, when the streaming process ends, the player buffer still stores packets to be played. Thus, before the playing session ends the network is not used to convey media stream packets.

In order to improve the utilization of the network, the amount of information that is transmitted may be increased. This increase can serve to improve the quality of the media stream, where the improvement can be allocated to media stream portions of various lengths. Assuming that a certain amount of information increment is provided, then the increment may be used to improve the quality of certain media stream portions. This increment can be used to transfer higher quality media streams.

The quality level, as well as the length of the quality enhanced media stream, may be increased. Higher quality level improvements are associated with shorter media stream time periods and vise versa. It is desirable to have large information increments to enable improved media stream quality. Nevertheless, the amount of information increment is limited by the network capability, and especially whether the network can guarantee a transmission of relatively more information, i.e., higher bit rates, over extended periods.

In other words, by allocating more bits to the last packets of a media stream, i.e., by increasing the encoding level of the media stream, the network is kept busy almost until the end of the playing process of the media stream packets at the player. Thus, the player buffer can be emptied towards the end of the streaming session, so that the network will be still used to transfer data/packets until the data is played almost in its entirety.

This can be achieved by modifying a target player buffer occupancy level and actually reducing said occupancy level towards the end of the streaming session. As a result of said target occupancy level reduction, the "idle" period in which the network is not utilized for conveying media stream packets is reduced.

The player buffer occupancy level cannot be reduced to such a point that there is a good chance of buffering due to fluctuations, or temporary reductions in the available network bandwidth.

It has been found that there is a tradeoff between possible buffering and utilization of possible bandwidth increment. This tradeoff depends upon the network stability. If there are substantially no fluctuations the risk of buffering is low, even when the player buffer is almost empty for a long period. Another factor that must be taken into account is the length of time during which the player buffer occupancy is low. Longer time periods may increase the risk of buffering.

The ability to effectively utilize any possible bandwidth increment may be based upon effective control schemes, such as those that are described below.

An advantage of the following embodiment is the ability to utilize the buffer occupancy levels to increase the effective bandwidth of the network that is allocated to the streaming process.

Stable networks allow better prediction of their capability to provide a certain bit rate during longer time periods. The control process takes into account a risk factor that reflects the stability of the network.

Figure 5:
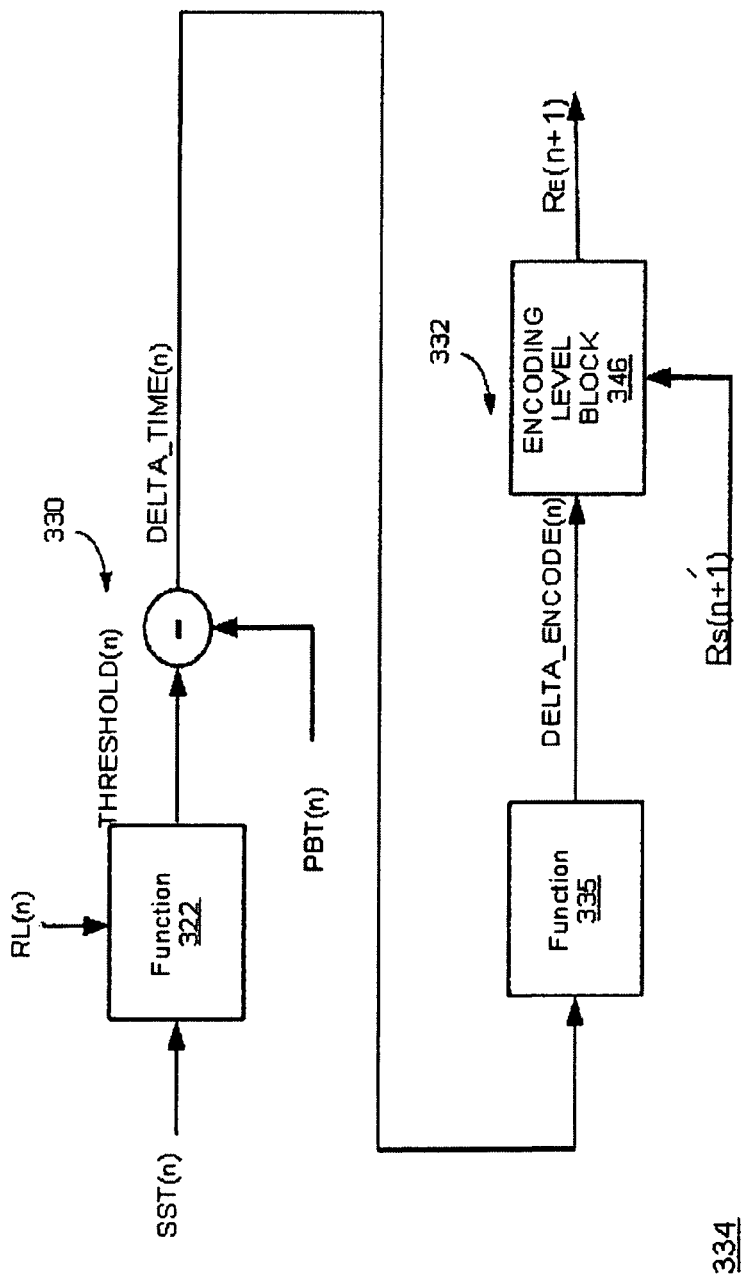
FIG. 5 is a detailed schematic illustration of processes, in accordance with a further embodiment of the invention.

FIG. 5 illustrates a sequence 334 of two processes 330 and 332. Sequence 334 is used to determine the encoding level of a streaming media stream.

The first process 330 receives input variable SST(n) that reflects the status of the streaming process. First process 330 also receives a risk level attribute RL(n) that reflects the network capability to stream media at certain rates, especially in a stable manner. Process 330 outputs THRESHOLD(n), which represents a target aggregate playing time associated with packets that are stored in the player buffer.

THRESHOLD(n) is used as an input into the second process 332 whose output is representative of the required encoding level.

In step 562 of FIG. 8 process 330 receives as input, variables SST(n) and RL(n). Function 322 of FIG. 5 calculates THRESHOLD(n) 568 in FIG. 8 using a number of thresholds and parameters. For example, THRESHOLD(n) has values according to Table III below:

TABLE III

| SST(n) | RL(n) | THRESHOLD(n) |
|---|---|---|
| Start | RL_Low | TH_SL |
| Start | RL_High | TH_SH |
| Middle | RL_Low | TH_ML |
| Middle | RL_High | TH_MH |
| End | RL_Low | TH_EL |
| End | RL_High | TH_EH |

RL(n) can be measured, for example, by the standard deviation of the network throughput. When the standard deviation is higher then a certain level RL(n) is equal to RL_High. When it is lower or equal then the threshold, RL(n) is equal to RL_Low. For example, when the player buffer maximal size is 20 seconds of the average network throughput, then the values of THRESHOLD(n) may be found in Table IV below:

TABLE IV

| THRESHOLD(n) | Value |
|---|---|
| TH_SL | 15 seconds |
| TH_SH | 14 seconds |
| TH_ML | 10 seconds |
| TH_MH | 13 seconds |
| TH_EL | 2 seconds |
| TH_EH | 5 seconds |

In step 570 of FIG. 8 THRESHOLD(n) is subtracted from PBT(n) to provide an input variable DELTA_TIME(n) as part of process 330 in FIG. 5. DELTA_TIME(n) is provided to function 335. Function 335 may apply various rule based decisions using a number of thresholds and parameters, such as those shown below in Table V, in order to provide output variable DELTA_ENCODE(n).

TABLE V

| DELTA_TIME(n) | DELTA_ENCODE(n) |
|---|---|
| DELTA_TIME(n) >= DTMAT | 1 |
| [DELTA_TIME(n) < DTMAT] AND [DELTA_TIME(n) > DTMIT] | 0 |
| DELTA_TIME(n) <= DTMIT | −1 |

Where DTMAT—is the delta time maximal threshold and DTMIT—is the delta time minimal threshold.

In step 578 of FIG. 8 DELTA_ENCODE(n) and the next streaming rate $R_S(n+1)$ are provided to an encoding level block 346 of FIG. 5 that determines the next encoding level $R_E(n+1)$.

Additional Embodiments

According to another aspect of the invention additional information regarding the media stream can be provided to the control process mentioned above, or even to other control processes, in order to further optimize the propagation of content through a sequence of buffers.

With reference to FIGS. 1 and 2, non-limiting examples of such information include the amount of data in network buffer 30, the duration of playing time in network buffer 30, the number of packets in network buffer 30, the amount of data in the client buffer/end user device buffer 40, the duration of playing time in the client buffer 40, the amount of data in media streamer buffer 20 and the duration of playing time in media streamer buffer 20. Another type of such information is the send-receive ratio, which is the ratio between the time required by the media streamer to send the sequence of packets (media streamer buffer 20 to the network buffer 30) and the time required by the client to receive the same sequence, i.e., from network buffer 30 to client buffer 40.

According to this embodiment various media stream segments, such as different scenes, are initially processed to determine a target size of their compressed and/or encoded representation. The target size reflects a certain compression level. In response to said determination media stream quality segments 10 are then encoded. This two-stage process can be used for allocating more bits to segments that includes more information.

It is assumed, for example, that a media stream is processed by a compression scheme such as one of the MPEG schemes. During a first processing step the media stream is analyzed.

During a second step the results of the analysis, such as media stream characteristics, are used for optimizing media stream compression. The optimization may be responsive to various criteria such as media stream perceptual quality, media stream average quality level, allowed segment quality changes, and the like.

The results of the first step may include required (relative or absolute) bit size per media stream segment. One method for such multi step processing is described at "Two-pass MPEG-2 variable bitrate encoding", P. H. Westerink R. Rajagopalan C. A. Gonzales, IBM Journal of Research and Development, Volume 43(4), July 1999, which is incorporated herein by reference. The article also discusses certain techniques to prevent player buffer overflow or underflow.

It is noted that the allocation of different bit rates per scene can also take into account the smoothing properties of various buffers, such as player buffer 40. The bit rate may fluctuate even in constant bit rate transmission, as long as the long-term average remains substantially unchanged.

The flexible allocation of bit rate from one scene to another is limited by the available network bandwidth, and in many cases is limited by average bit rate requirements.

This flexible allocation of bit rate may facilitate allocating a larger amount of bit rates to a complex scene that is preceded by a simple scene.

According to an embodiment of the present invention the results of the first pass and/or the processed representation of the media stream after the second pass may be used to determine player buffer target occupancy levels. For example, wherever the size of a certain frame is high, the target player buffer occupancy level may be decreased, and vice verse.

The changes in the player buffer target occupancy level may also be responsive to the risk level associated with the network.

The alteration of target occupancy levels in response to the results of the first pass, or the size of processed media stream after the second pass, can be useful when a complex frame or scene is preceded by a simple frame or scene and wherein the timing of both frames or scenes allows the player buffer to store both frames or scenes.

According to another embodiment of the present invention the control process may be further responsive to additional information reflecting the network policy rules/behavior. This additional information may reflect either input variables provided to the control processes or even the processes themselves. For example, such additional information may be used to update the network bit-rate variable.

The additional information may reflect bit rate allocation among different parts of the network. For example, a network management entity can allocate network bandwidth in response to end users device buffer occupancy, network buffer occupancy level, end user priority and the like. Accordingly, network buffers that are maintained at a first occupancy level may be allocated more bandwidth than network buffers that are maintained at a different occupancy level.

The ability to influence the bandwidth allocation given by the network through controlling the network buffer, allows the network management entities to control the relative bandwidth allocation among a group of users, while maintaining some constraint or dependency among the allocations made to different users. An exemplary constraint is that the total bandwidth be essentially constant. This can be used for quality of service differentiation among different clients, even if all use the same bandwidth, as far as the agreement with the carrier goes.

By using two-pass encoding on a group of clients, the variable relative allocation can be used to temporarily allocate more bandwidth for transmitting certain scenes to a certain client in relation to another transmission aimed to another client. Said extended bandwidth allocation can be used for transmitting higher encoding level scenes.

A further embodiment is a streaming proxy. The streaming proxy acts as a streaming client towards a streaming server or another proxy. It renders a streaming server towards the client or a further proxy (the "next client"). Its essential components are a streaming client, a streaming server ("streamer"), a real-time transcoder, and a control unit. The real time transcoder may modify the signal sequence characteristics in order that they comply with the next client capabilities and the network capacity. The control unit receives control parameters via the streamer component and uses them over time to determine the characteristics specified to the transcoder and the streamer components. Said control parameters may be parameters such as those available in RTP, RTSP or 3GPP release 6 extensions, but are not limited to this parameter set.

The following sections, describe an exemplary implementation of streamer controller 70 in the streaming proxy case of FIG. 1b. The implementation described is not limited to the streaming proxy case. It is however suitable for this case since usually the proxy does not have access to the input stream before the session starts, and cannot prepare several streams in advance with different qualities and bit-rates. The implementation is based on the well known Real Time Protocol/Real Time Control Protocol (RTP/RTCP) 5 of FIG. 1a, with reference to A Transport Protocol for Real-Time Application, IETF RFC 1889, January 1996.

Specifically, RTP packets carry the data, while RTCP packets 5 carry control information. RTCP reports 5 are sent by player buffer 40 to streamer controller 70, which estimates the network conditions, and outputs to the video encoder updated bit-rate and frame-rate settings. In this implementation there is no streaming buffer 20. I.e. the encoding rate equals the streaming rate.

Estimating Network Conditions

The network conditions are estimated upon receiving an RR (receiver report) packet from player buffer 40. Streamer controller 70 keeps track of the history of RTP and RCTP packets 5 and their timing in order to estimate the network conditions.

The network rate bandwidth (BW)=RN(n) is estimated as follows. Let TimeDiff be the time elapsed while NBits enter player buffer 40. Note that both RR reports used for the estimation must relate to the same SR (sender report) packet. Then BW is estimated by calculating the ratio NBits/TimeDiff. The value Nbits preferably takes into consideration lost packets as reported by the RTCP RR packets 5. A smoothed rate BW is calculated, for example, by applying a weighted average on the last several unsmoothed results. The average operation may give lower weight to older results. As described below, the smoothed rate BW is used to determine the available rate for encoding.

Additional conditions are estimated and used for the state machine control as explained below. These conditions include DataInNW, TimeInNW, packetsInNW and sendReceiveRatio. To estimate the first three conditions one needs to locate two packets among the RTP history packets. One is the last packet that entered player buffer 40 (and was reported in the last RR) and the other is the RTP, which entered network buffer 30 at approximately the same time. To find the second one we need to search the RTP history UplinkTime earlier than the receive time of the last RR. The UplinkTime is the time it takes a packet sent from the player to arrive at the streaming server. The UplinkTime depends mostly on the network rate, on the network buffer 30 occupancy and on the delay due to the mobile radio link. UplinkTime may be configured as a constant. Alternatively, it may be estimated using RTCP reports 5. This estimation is preferably done once at the beginning of the session. At the beginning, network buffer 30 is close to empty and the round trip delay (RTD) corresponds essentially to the mobile radio link. Assuming symmetric radio up/down link, estimate UplinkTime according to:

$$UplinkTime=RTD/2$$

The forth condition, sendReceiveRatio is calculated as follows. Let RRtimeDiff be the sending time difference between two RR packets sent by the player buffer 40. Let RTPtimeDiff be the time difference between the sending times of the corresponding RTP packets. The sendReceiveRatio is calculated by:

$$sendReceiveRatio=RTPtimeDiff/RRtimeDiff$$

The ratio indicates whether network buffer 30 is being filled or emptied. If the ratio is above 1.0, then the packets exit network buffer 30 at a higher rate than entering it, and network buffer 30 occupancy decreases. If the ratio is below 1.0, network buffer 30 occupancy increases.

Controller State Machine

Streamer controller 70 includes a state machine to enforce different behavior under different network conditions. The state machine defines three logical states EMPTY, NON_EMPTY and FULL, describing network buffer 30 occupancy. In the empty state bit-rate should be increased in order to fill up network buffer 30. The full state suggests that network buffer 30 may be too full and may drop packets. In this case one should decrease the bit-rate aggressively. In the NON_EMPTY state one tries to converge to some predefined working point. In the exemplary implementation the working point is defined as some occupancy level of network buffer 30. The working occupancy should preferably not exceed a quarter to half of network buffer 30 in order to lower the latency and to avoid the FULL state.

The current state is determined according to the network conditions. If any of the values DataInNW, TimeInNW, packetsInNW or emptyingTime exceeds its corresponding predefined limit, then the selected state is FULL. On the other hand, if all the values DataInNW, TimeInNW, packetsInNW, emptyingTime and sendReceiveRatio are below their corresponding predefined limits, then the selected state is EMPTY. Otherwise the selected state is NON_EMPTY. Additional logic may optionally be added to avoid a direct transition between the EMPTY and FULL states.

Calculating the Total Bit-Rate

The bit-rate calculation depends on the state as follows:
In the empty state:

$$Bit\text{-}Rate=BW\_smoothed*KEm+KEa$$

Where KEm and KEa are some predefined non-negative multiplication and addition factors, respectively.
In the full state:

$$Bit\text{-}Rate=BW\_smoothed*KFm-KFa$$

Where KFa is some predefined non-negative addition factor. KFm depends on an estimated emptying time of network buffer 30. If the emptying time is above some predefined value, KFm is reduced. If it is below the predefined value, then Kfm is increased. The emptying time is estimated as the ratio between DataInNW and BW_smoothed.
In the non empty state:

$$Bit\text{-}Rate=BW\_smoothed+KNm*[DesiredOccupancy-((DataInNW)/DesiredOccupancy)^{KP}* DesiredOccupancy]$$

Where DesiredOccupancy is the predefined working point, KNm is a predefined non-negative multiplication constant and KP is an exponent. KP should preferably be set to a value in the range 0.66 to 1.5.

By properly defining the multiplicative, additive and exponential constants one can achieve an optimum tradeoff between a fast, but less stable behavior and slower, smoother behavior.

In order to avoid unstable behavior, limitations should preferably be applied. For example limit the maximal Bit-Rate change relative to the previous calculation and time elapsed.

In some cases, depending on the actual network behavior, it may be advantageous to degenerate the controller to work only with the non-empty state and possibly with the empty state as well.

There may be situations when the video contains intervals with very little or no motion at all. In such cases the encoder rate and streaming rate drop to low levels. Then streamer controller 70 estimates low occupancy in network buffer 30, as well as low bandwidth at the network. In this case the bandwidth requested from the encoder will be low, even though the network is able to transfer a higher bit-rate. To avoid this, a condition may be added when calculating the bit-rate. The condition says that while in the empty state, if the new calculated bit-rate is lower than the previous calculated one, ignore it and use the previous one.

Split Bit-rate

The bit-rate calculated above is the total bit-rate available for both the visual and audio parts of the video. The total bit-rate is preferably split between the video encoder and the audio encoder. In the exemplary implementation one assumes constant bit-rate for the audio encoder and the rest goes to the video encoder. In low bandwidth networks, such as GPRS, the audio bit-rate should be lowered in order to give higher bit-rate to the video encoder.

Calculating the Frame-rate

As the visual part bit-rate increases the encoder frame-rate can be increased to improve the quality. On the other hand, when the video encoding bit-rate is low, the frame rate must be lowered as well. Preferably, one defines the best combination of bit-rate and the frame-rate values empirically using the specific video encoder. Moreover, if the frame-rate is constantly changed, encoder behavior may suffer. Therefore it is preferable to change the frame-rate occasionally, e.g., at least at 2 second intervals, and change only when there is significant change in the bit-rate, e.g., at least 20%.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A method for determining at least one signal sequence characteristic of a signal sequence that propagates through at least three cascaded buffers of a packet processing streaming digital video compression network culminating in a digital video player, the method comprising:
providing status information reflecting a status of at least a third buffer and a second buffer of said at least three buffers; and
applying at least one process to determine the at least one signal sequence characteristic, in response to the status information;
wherein the at least one signal sequence characteristic includes a ratio between a first time required by a media streamer to send a sequence of packets and a second time required by a client to receive the sequence.

2. The method of claim 1, wherein the at least three cascaded buffers are a streamer buffer, a network buffer and a player buffer.

3. The method of claim 2, further comprising entering of packets into the network buffer before said providing step.

4. The method of claim 3, further comprising receiving of reports from the player buffer reporting about at least the last packet that arrived at the player buffer.

5. The method of claim 4, wherein said reports are Real Time Control Protocol (RTCP) reports.

6. The method of claim 5, further comprising decoding said packets and playing said packets by the player, such that the available bandwidth is fully exploited, and a stream is delivered with the highest available quality, without losing packets, and without causing the player to stop for re-buffering.

7. The method of claim 1, wherein the at least one process is responsive to network policy rules, and wherein the process is updated in response to previously determined characteristics.

8. The method of claim 7, wherein said update is implemented by neural networks.

9. The method of claim 7, wherein the update is implemented by a state machine.

10. The method of claim 7, wherein the update is implemented by fuzzy logic.

11. A method for determining multiple signal sequence characteristics of a signal sequence that propagates through at least two cascaded buffers, the method comprising:
providing status information reflecting a status of at least two cascaded buffers; and
applying at least one process to determine multiple characteristics of the signal sequence, in response to the status information;
wherein the at least one signal sequence characteristic includes a ratio between a first time required by a media streamer to send a sequence of packets and a second time required by a client to receive the sequence.

12. The method of claim 11, wherein the at least two cascaded buffers are a network buffer and a streamer buffer.

13. The method of claim 11, wherein the at least two cascaded buffers are a network buffer and a player buffer.

14. The method of claim 11, wherein the at least two cascaded buffers are a player buffer and a streamer buffer.

15. A method for determining at least one signal sequence characteristic of a signal sequence that propagates through a network towards a target buffer, the method comprising:
receiving status information reflecting a status of at least the target buffer and a network buffer representative of the buffering characteristics of the network; and
applying at least one process to determine, in response to the status information, the at least one signal sequence characteristic;
wherein the at least one signal sequence characteristic includes a ratio between a first time required by a media streamer to send a sequence of packets and a second time required by a client to receive the sequence.

16. A controller for determining at least one signal sequence characteristic of a signal sequence that propagates through at least three cascaded buffers, the controller comprising:
state machine configured to enforce different behavior under different network conditions;
wherein the controller receives status information reflecting a status of at least a third buffer and a second buffer of the at least three cascaded buffers and provides output representative of at least one signal sequence characteristic of the signal sequence; and
wherein the at least one signal sequence characteristic includes a ratio between a first time required by a media streamer to send a sequence of packets and a second time required by a client to receive the sequence.

17. A system for transmitting a signal sequence via an intermediate buffer towards a target buffer, the system comprising:
a status information providing means, for providing status information reflecting a status of at least the target buffer and the intermediate buffer;
a controller, coupled to said status information providing means to determine at least one signal sequence characteristic, in response to the status information; and
a signal sequence provider, for transmitting at least a signal sequence portion in response to the at least one signal sequence characteristic;
wherein the at least one signal sequence characteristic includes a ratio between a first time required by a media streamer to send a sequence of packets and a second time required by a client to receive the sequence.

18. The system of claim 17, further comprising a network component providing a process that is responsive to network policy rules, wherein the process is updated in response to previously determined characteristics.

19. The system of claim 18, wherein the update is implemented by neural networks.

20. The system of claim 18, wherein the update is implemented by a state machine.

21. The system of claim 18, wherein the update is implemented by fuzzy logic.

22. The system of claim 17, further comprising a status information providing means, for providing status information reflecting a status of at least the target buffer and the intermediate buffer.

23. The system of claim 16, wherein said control parameters are parameters such as those available in at least one of RTP, RTSP and 3GPP release 6 extensions.

* * * * *